United States Patent
Moench et al.

(10) Patent No.: US 6,631,996 B2
(45) Date of Patent: Oct. 14, 2003

(54) PROJECTION SYSTEM, AND METHOD OF OPERATING A PROJECTION SYSTEM

(75) Inventors: Holger Moench, Vaals (NL); Xaver Riederer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 29 days.

(21) Appl. No.: 09/852,357

(22) Filed: May 9, 2001

(65) Prior Publication Data

US 2002/0008851 A1 Jan. 24, 2002

(30) Foreign Application Priority Data

May 12, 2000 (DE) .......................... 100 23 342

(51) Int. Cl.[7] .................... G03B 21/20; G03B 21/00; H04N 9/12; G02B 27/10
(52) U.S. Cl. ............................. 353/85; 353/84; 353/86; 353/94; 353/121; 348/742; 348/743; 359/618
(58) Field of Search ..................... 353/84, 31, 94, 353/85, 86, 121; 348/743, 742; 359/618, 722

(56) References Cited

U.S. PATENT DOCUMENTS

| 5,428,408 | A | | 6/1995 | Stanton | 348/742 |
|---|---|---|---|---|---|
| 5,608,294 | A | | 3/1997 | Derra et al. | 315/224 |
| 5,680,180 | A | | 10/1997 | Huang | 348/656 |
| 5,917,558 | A | * | 6/1999 | Stanton | 348/743 |
| 6,252,636 | B1 | * | 6/2001 | Bartlett | 348/743 |
| 6,324,006 | B1 | * | 11/2001 | Morgan | 359/618 |
| 6,392,717 | B1 | * | 5/2002 | Kunzman | 348/744 |
| 6,520,648 | B2 | * | 2/2003 | Stark et al. | 353/85 |

FOREIGN PATENT DOCUMENTS

| EP | 0865210 | 9/1998 | H04N/9/31 |
|---|---|---|---|
| WO | WO9511572 | 4/1995 | H04N/9/14 |
| WO | WO9724871 | 7/1997 | H04N/5/74 |

* cited by examiner

Primary Examiner—Russell Adams
Assistant Examiner—Melissa J Koval
(74) Attorney, Agent, or Firm—Ernestine C. Bartlett

(57) ABSTRACT

A method of operating a projection system with at least one high intensity discharge lamp (HID lamp), a rotatable color disc with at least three segments of different colors, and an array (DMD) comprising a plurality of individually movable mirrors, wherein the current strength of the electrical operating current supplied to the HID lamp is varied in time such that the light arc of the lamp is stabilized, is to be constructed such that the power and operational life of the HID lamp used are optimized. The current strength of the operating current for the HID lamp is for this purpose varied such that the current strength reaches a maximum when a given segment of the color disc, and preferably exclusively this segment, is present in the radiation path of the light rays used for the projection.

10 Claims, 1 Drawing Sheet

PROJECTION SYSTEM, AND METHOD OF OPERATING A PROJECTION SYSTEM

BACKGROUND OF THE INVENTION

The invention relates to a projection system and to a method of operating a projection system.

A sequence of colors is generated with the aid of the lamp here, and the current strength of an electrical operating current supplied to the lamp is varied in time. Such a variation may serve in particular for stabilizing a lamp arc. In such a projection system, accordingly, means are provided for controlling the current strength of the electrical operating current supplied to the lamp in time, preferably for stabilizing the light arc, and means for generating a sequence of colors by means of the lamp. The lamp used may be in particular a high intensity discharge lamp.

The above projection systems have been known for a considerable time in various forms, for example from WO 95/11572, for example as DLP (digital light processing) projection systems. They usually comprise at least one high intensity discharge lamp (HID lamp) by means of which an array is illuminated, this array being a so-called deformable mirror device or digital mirror device, DMD for short. The individual mirrors of the array form a raster by means of which picture samples are generated and, for example, video images can be displayed. For this purpose, the individual mirrors are pivoted such that they appear bright or dark to the observation, which observation usually does not take place directly. Instead, at least a lens, a deflection mirror, and a picture screen or projection screen are usually present in the radiation path between the array and the eye of an observer.

To generate colored pictures, a fast-rotating color disc is provided in the projection systems, which disc usually comprises at least three segments with the basic colors required for an additive color mixing, i.e. for example red, green, and blue. The colored segments of the color disc usually comprise dichroic filters (so the filter discs are sometimes also referred to as filter wheels), which transmit only light of a given color, so that the light passing through them appears to be, for example, red or green. Colored light rays arriving shortly one after the other are joined together in the eye so as to form a new color impression. It is accordingly possible to generate pictures of any color by means of the fast-rotating color disc and a corresponding control of the individual mirrors.

An alternative for a color wheel is, for example, an electro-optically switchable filter which can be switched in its entirety between various colors and white through the application of a control voltage. Such an element is described, for example, in "Progress in Field Sequential Color Shuttered Technology" by G. Scharp et al. in Proc. SPIE vol. 3013, pp. 107 to 111, 1997.

The rotating color disc or the means for generating a sequential color series may be arranged in such projection systems in principle both downstream and upstream of the DMD in the radiation path from the lamp to the eye. Usually, however, they are provided between the lamp and the DMD.

The known projection systems usually require high intensity discharge lamps with a constant luminous flux, i.e. the lamp must always supply the same amount of light. An example of such a system is found in U.S. Pat. No. 5,680,180. Such HID lamps, however, are problematic as regards the stability of the discharge arc and the operational life of the electrodes. A method of operating a HID lamp with a short light arc is known from U.S. Pat. No. 5,608,294, where the stability of the light arc and the life of the electrodes is substantially improved. The operating current is varied therein such that a stabilization of the lamp arc is achieved. This method, however, cannot be applied to the known projection systems because these systems usually require a constant luminous flux.

It is known from WO 95/11572 to vary the current strength of the operating current of the lamp so as to compensate for color drifts caused by the system and to adjust the color balance. According to the teachings of WO 95/11572, it is essential to adapt the current strength of the operating current of the HID lamp to the requirements of the projection system. This detracts from the lamp properties; in particular, problems arise with the stability of the light arc and electrodes.

OBJECTS AND SUMMARY OF THE INVENTION

In view of the above, the invention has for its object to provide a projection system and a method of operating a projection system which render it possible to operate the HID lamp used with optimized power and operational life without undesirable artefacts arising owing to the non-constant luminous flux, and in particular without problems arising in the color reproduction.

This object is achieved by means of a method and a projection system having the characteristics as defined in the respective main claims. Advantageous implementations and further embodiments are given in the dependent claims.

It should be noted here that the variation of the current strength according to the invention does lead to a certain amount of pulsatory operation of the lamp, but that this does not refer to the type of lamp operation usually denoted "pulsatory operation" in which a lamp is operated during very short time periods in quick repetition, but does not supply any light for a major portion of time. Such lamps are also sometimes used in projection systems (cf. for example EP 0 865 210 A2, WO 97/24871, or U.S. Pat. No. 5,428,408). The "pulsatory operation" proposed here relates instead to a special form of the current strength gradient in time which leads to a stabilization of the lamp arc. The lamp does provide light here at all times, or at least substantially at all times, but the quantity of light is not constant in time; instead, it follows the current waveform necessary for stabilization.

It is obvious in this connection that the means according to the invention for generating a sequence of colors may be constructed in accordance with any suitable type. It is essential that such a device is capable of generating a sequence of different colors, including white if necessary. In addition, the invention is not limited to a DMD, but it may also comprise, for example, displays or projection systems in which the mirrors are replaced by ferroelectric LCDs. The invention is particularly suitable for projection systems in which colors as well as any desired grey tones are generated through a time-modulated switching of a binary display element within the framework of a pulse width modulation.

The cited U.S. Pat. No. 5,680,180 suggests a system with adjustable color discs for the adjustment of the color balance which is highly complicated by comparison.

A substantially simpler control of the color balance, however, is possible according to the invention in that the maximum of the current strength is achieved the moment a given color is generated, i.e. when a given segment of a color disc is present in the radiation path of the light rays used for the projection. It may be desirable, for example for the display of video sequences by means of a projection system with a color disc with segments in the three basic colors red, green, and blue as well as possibly white, i.e. white light transmitting segments, to put a stronger emphasis on the red component in the color mixing. For this purpose, the system is then controlled such that the lamp shines particularly brightly whenever the or a red segment of the color disc is in the radiation path. The adjustment of the color balance may accordingly take place exclusively through a suitable control and synchronization of the lamp current and the color disc rotation, according to the invention, which is advantageous because of the simplicity of the solution compared with other known solutions, for example solutions with different color discs for different application purposes (data display, for example display of tables, vs. video display with colors as natural as possible).

Whereas the realization of an exact control is comparatively complicated, the entire arrangement can be substantially more simply controlled if the maximum in the generation occurs exactly at a color, i.e. exactly in a segment.

A particularly advantageous embodiment of the method of generating a color sequence which comprises at least white is obtained when the control of the lamp current takes place such that the maximum current strength is reached when the color white is being generated. This has the major advantage, for example, that the fluctuation in the lamp brightness necessary for stabilizing the lamp arc does not lead to a change in color, but merely in the saturation of the color, the latter being hardly perceivable to the human eye.

A second advantage of this method of control is that the calculation of the grey tones (brightness values) in the generation of a digital picture can still be based—as usual until now—on a luminous flux which is constant in time, so that the calculation algorithms which have proven to be correct can be utilized.

A third advantage is finally that the fact that the highest brightness of the lamp falls in the region of projection of white light means that the time duration for generating the white component of the color sequence can be shorter, so that more time is available for the generation of the colored components of a pixel.

Preferably, the pulse duration corresponds substantially to the passage of the relevant segment. It is safeguarded thereby that exclusively this segment is influenced by the pulse, while the other segments are influenced by the non-pulsed range. It was found in this respect that a variation of ±5%, in particular of ±1%, at the start and end of the white generation in relation to the total duration of the white generation leads to satisfactory results.

It is advantageous for lamp stability as well as for a simple process control when the luminous flux supplied by the lamp disappears for a short period only or not at all.

The synchronization means serve to safeguard a color stability during projection. It is obvious that for such synchronization means all possibilities may be utilized which appear conceivable and practicable with respect to the means for generating the color sequences and the means for controlling the lamp operating current strength. For example, these means may be clocked by a common clock generator. Alternatively, one of these means, for example the rotating color disc, may provide a suitable clock, which is then correspondingly utilized.

A color adaptation may be carried out in a constructionally very simple manner through a suitable phase shift which may be enabled by the synchronization means. This is advantageous in particular for color balances which may be changed in time and which can be fine-tuned by means of a new calculation or supplementary calculation.

Preferably, the proportion of the time period during which the color white is generated during operation of the projection system lies between approximately 3 and 15%, preferably between approximately 6 and 12%, of the total duration of a color generating sequence. In this manner, comparatively much time is available for the generation of the actual colors. When a color disc is used, this means that the white segments may account for approximately 6 to 12% of the total surface area of the color disc and are accordingly penetrated by light from a HID lamp during approximately 6 to 12% of the total duration of the color disc revolution.

DESCRIPTION OF THE PREFERRED EMBODIMENTS

Figure 1:
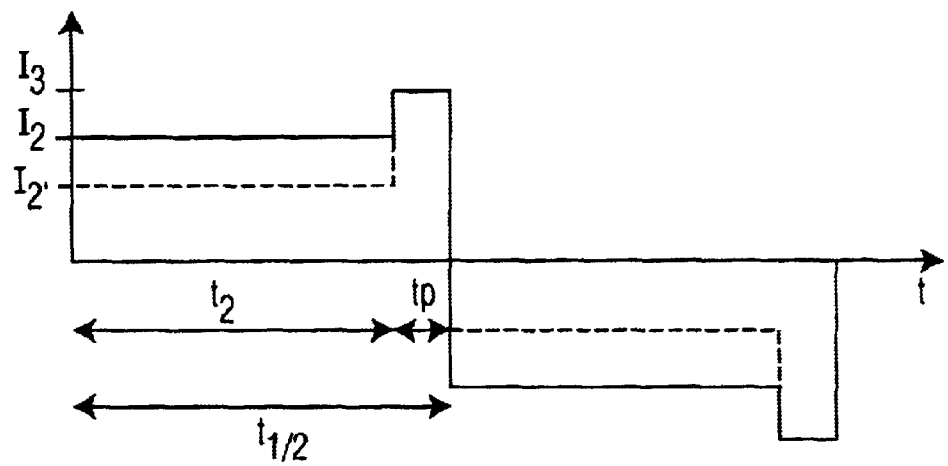
FIG. 1 is a timing diagram of one embodiment of a current waveform suitable for use in controlling lamp operating current in accordance with the invention.

The accompanying Figure illustrates a typical current waveform in which a full cycle of the lamp current equals $2*t_{1/2}$. During a period $t_P$, an increased lamp current $I_3$ is used for stabilizing the lamp in accordance with U.S. Pat. No. 5,608,294. Whereas the current strength $I_3$ suitable for lamp stabilization remains constant through lamp life, the current strength $I_2$ is corrected during lamp life, for example to $I_2$, so as to guarantee a constant total lamp power in the case of a possibly changed lamp voltage.

The quantity of light supplied by the lamp during one cycle of the current follows the current waveform. As a result, the ratio of the increased light quantity during the pulse, the light pulse, to the quantity of light supplied during the remaining time is subject to changes through lamp life. The relative color component which corresponds to the position of the filter wheel at the moment of the increased lamp current changes correspondingly.

To check the influence on the color balance of the projected picture, it is advantageous to synchronize the lamp operating frequency with which the pictured current waveform is repeated with the frequency with which the color sequence is generated, and thus with the image frequency. Suitable synchronization means, such as a clock generator, may be provided for this. Ideally, it is thus ensured that the increased light quantity always occurs in a filter segment of the same color.

If the relative increase in the light quality is constant, it can be used for a new calculation of the color balance for obtaining a correction factor.

As a rule, however, the relative light quantity changes randomly during ageing of the lamp. This may lead to color shifts during the life of the appliance. A particularly advantageous embodiment of the method utilizing a color disc with one or several white segments in addition to colored segments provides that the pulse is placed in one segment or several white segments of the filter wheel. A change in the relative white component does not lead to a shift in the color impression, for example from neutral to greenish, but only to a shift in the color saturation similar to bleaching. This is considerably less unpleasant for a viewer.

Grey tone levels are generated on the DMD display during the passage of one color segment through a shorter or longer switching-on of individual mirrors. The quantity of light should remain as constant as possible for achieving a correct calculation of the linearity of such a grey scale. Accordingly, a particularly advantageous arrangement is one in which the pulse duration corresponds substantially to the duration of, for example, the white segment, so that also these calculations remain valid owing to the constant height of the pulse.

A typical filter wheel may comprise, for example, a white segment of 36°, corresponding to 10% of its rotation cycle. This requires a pulse duration of 10% of the current cycle. To avoid visible artefacts, the frequency of the color change is increased in practice in that the filter wheel revolves twice or three times during one image (frame frequency). Given a video frequency of, for example, 50 Hz, this means a rotation frequency of the filter wheel, and thus a frequency of passage of the white segment or the pulse, of 100 or 150 Hz. Since a full cycle of the lamp current contains two pulses, the lamp will be operated with a frequency of 50 or 75 Hz.

As is immediately apparent, a color shift, for example towards the red, in such an arrangement can take place owing to a phase shift between the color wheel and the lamp control whereby the pulse is shifted into the red region. A similar shift is obviously also possible for the other color segments.

Figure 2:
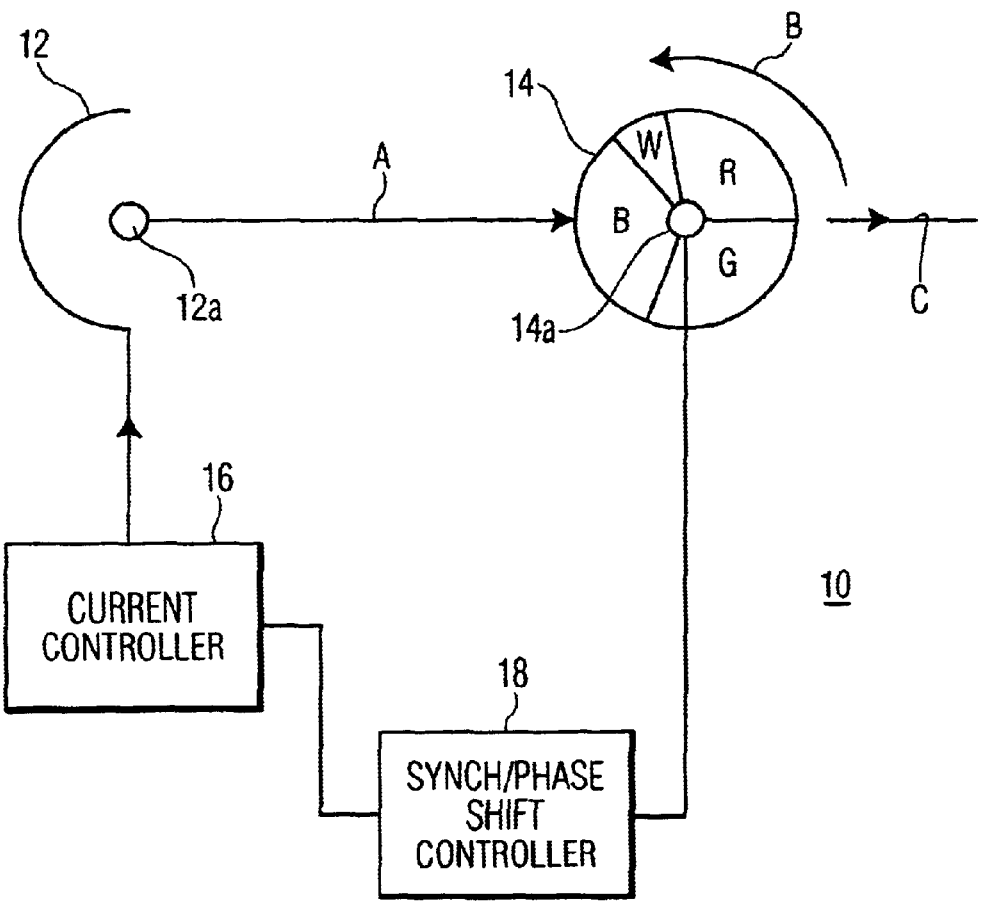
FIG. 2 is a schematic diagram of a projection system employing a lamp current controller in accordance with the invention.

FIG. 2 shows a projection system 10 including a high intensity discharge lamp 12 having an arc 12a, a color wheel 14 having means 14a for rotating the color wheel, a control means in the form of current controller 16 and a synchronization means in the form of sync/phase shift controller 18. Color wheel 14 has color filter segments in the colors red (R), green (G), blue (B) and white (W). In operation, white light (arrow A) from lamp 12 strikes the color wheel 14. Rotation means 14a rotates wheel 14 in the direction of arrow B, causing the white light to encounter the color filters in the sequence R, G, B, W, thus converting the light transmitted by the filters (arrow C) into a sequential series of the colors R, C, B, W, with the aid of the lamp. During operation, current controller 16 controls the operating current of the lamp 12, for example, in accordance with the timing diagram of FIG. 1. Current controller 16 is operationally linked to color wheel rotation means 14a by synch/phase shift means 18, which synchronizes the rotation of color wheel 14 with the timing of current controller 16. Synch/phase shift means 18 also includes means for achieving a phase shift or phase adjustment between the color wheel 14 and the current controller 16.

What is claimed is:

1. A method of operating a projection system with at least one lamp, wherein a sequential series of colors is generated with the aid of the luminous flux of the lamp and wherein the current strength of the electrical operating current supplied to the lamp is varied in time, wherein the sequential series of colors comprises at least white, characterized in that the current strength of the operating current of the lamp is varied such that the current strength reaches a maximum when white is being generated.

2. A method as claimed in claim 1, characterized in that the variation of the current strength of the operating current of the lamp such that the maximum of the current strength comprises a pulse, the duration of said pulse corresponding substantially to the duration of the generation of the given color.

3. A method as claimed in claim 1, characterized in that the current strength of the operating current of the lamp is varied such that the luminous flux supplied by the lamp during operation of the projection system is substantially continuous.

4. A method as claimed in claim 1, characterized in that the means for generating a sequential series of colors comprise a color disc.

5. A method as claimed in claim 4, wherein the color disc comprises at least one white segment, characterized in that the white segment surface area entering the path of the luminous flux used for the projection accounts for between approximately 3 and 15%, of the total surface area of all segment surfaces of the color disc entering the path of the luminous flux used for the projection.

6. A method as claimed in claim 5, wherein the white segment surface area accounts for between approximately 6 and 12% of the total surface area of all segment surfaces of the color disc entering the path of the luminous flux used for projection.

7. A projection system comprising at least one lamp, preferably a high intensity discharge lamp, with means for generating a sequential series of colors including the color white with the aid of the lamp and with means for controlling the current strength of the electrical operating current supplied to the lamp in time, preferably for stabilizing the light arc, characterized in that said control means are operationally linked to the means for generating a sequential series of colors by synchronization means and for maximizing the lamp current strength when white is being generated.

8. A projection system as claimed in claim 7, characterized in that the synchronization means comprise means for achieving a phase shift or phase adjustment between the means for generating a sequential series of colors and the control means.

9. A projection system as claimed in claim 7, characterized in that the proportion of the time duration in which the color white is generated during operation of the projection system lies between approximately 3 and 15%, of the total duration of a color generating sequence.

10. A projection system as claimed in claim 9, wherein the proportion of the time duration in which the color white is generated during operation of the projection system lies between approximately 6 and 12% of the total duration of a color generating sequence.

* * * * *